Aug. 17, 1965    M. FERENC    3,200,737
COOKING UTENSIL
Filed Feb. 3, 1964    2 Sheets-Sheet 1
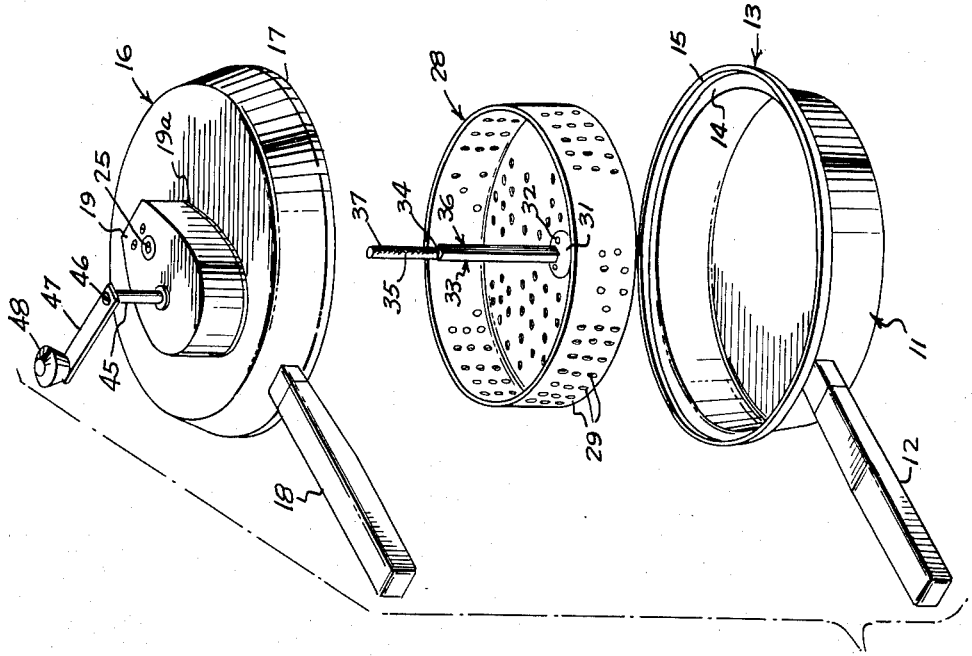
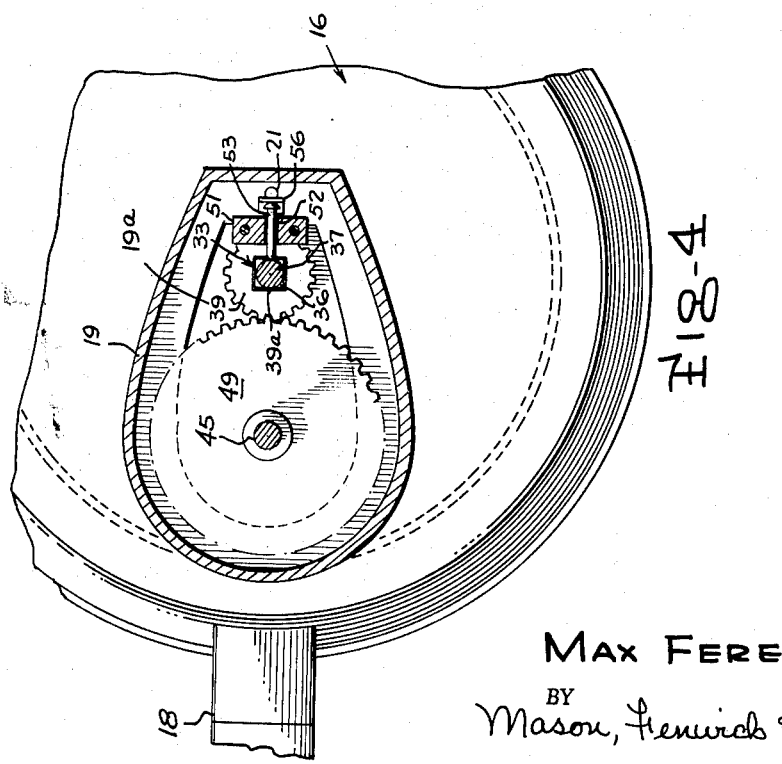
INVENTOR
MAX FERENC
BY Mason, Fenwick & Lawrence
ATTORNEYS Aug. 17, 1965  M. FERENC  3,200,737
COOKING UTENSIL
Filed Feb. 3, 1964  2 Sheets-Sheet 2
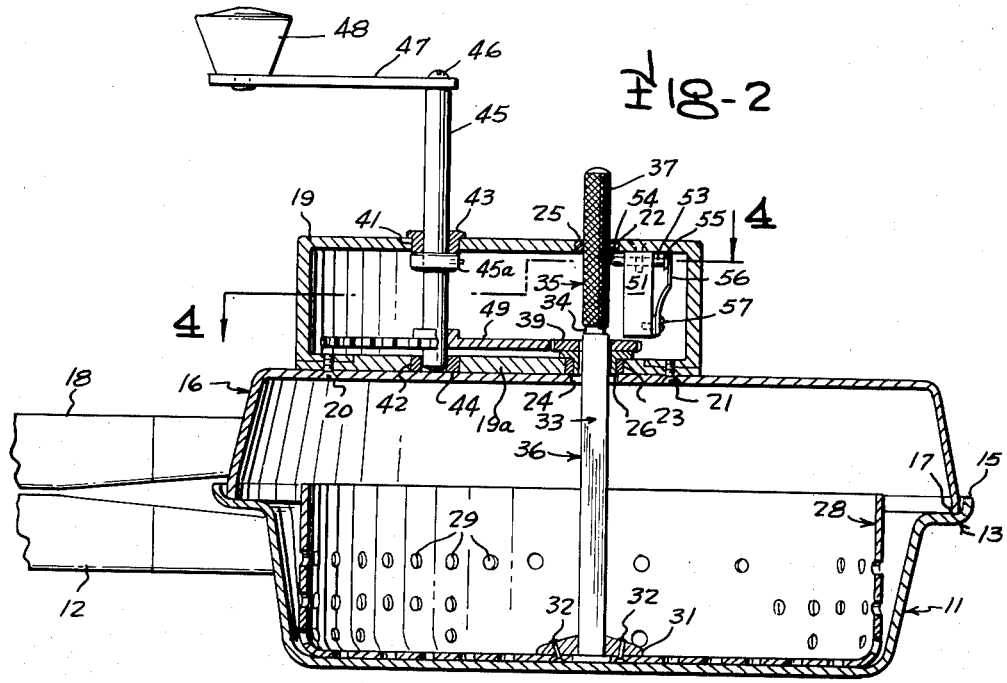
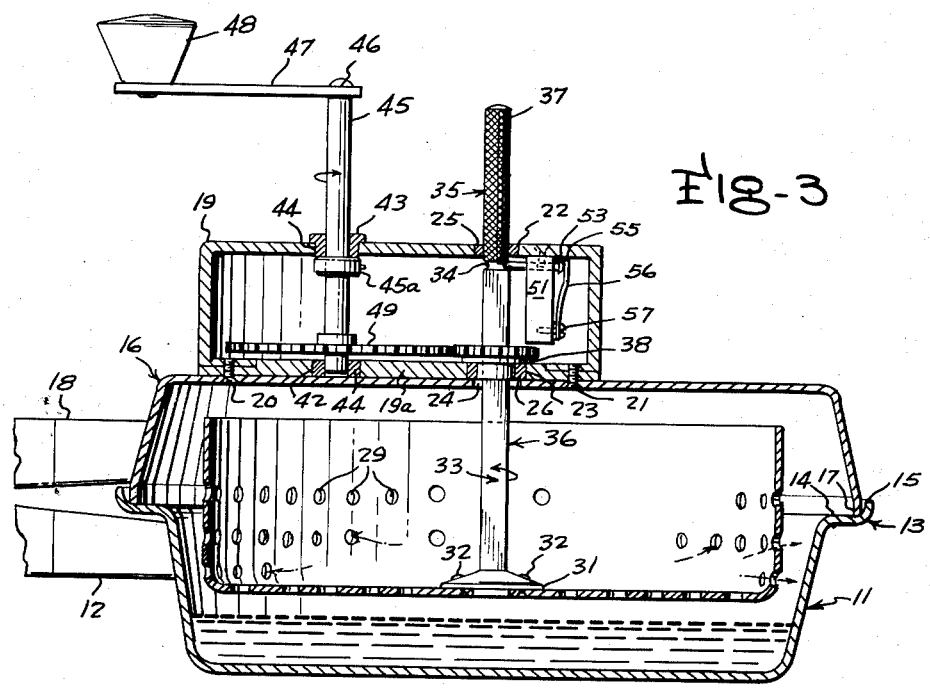
INVENTOR
MAX FERENC
BY Mason, Fenwick & Lawrence
ATTORNEYS United States Patent Office 3,200,737
Patented Aug. 17, 1965

3,200,737
COOKING UTENSIL
Max Ferenc, R.R. 1, Dresden, Tenn.
Filed Feb. 3, 1964, Ser. No. 341,907
4 Claims. (Cl. 99—355)

This invention relates to improvements in cooking utensils and more particularly to a utensil for removing excess frying liquid from fried foods.

It is a well recognized fact that a diet having a high fat content is not desirable and that persons having previous histories of arterial or cardiac disorders should be limited to very low fat content diets. Normally, fried foods have a high fat content because once the frying is completed there is no satisfactory way to remove the excess frying liquid from the fried foods. Thus the fried foods retain a considerable quantity of the frying liquid, thereby causing these foods to be unsatisfactory for consumption by certain persons. By removing the excess frying liquid from fried foods while the liquid is still warm the fat content of the fried foods can be reduced considerably.

The primary object of this invention is the provision of an improved utensil for cooking fried foods and for removing the frying liquid from these foods immediately upon the completion of the frying.

Another object of this invention is the provision of a closed cooking utensil having a separable internal food holding container which may be raised within the closed utensil and spun to remove excess frying liquid from the fried foods.

Another object of the invention is the provision of a cooking utensil wherein means are provided to retain the internal food holding container in a raised position while it is spun.

Another object of this invention is the provision of a cooking utensil having a fried food container completely enclosed within the utensil which may be spun from outside of the utensil to confine the scattering of the frying liquid particles within the utensil.

Further aims, objects and advantages of this invention will appear from a consideration of the following description and the accompanying drawings showing for purely illustrative purposes embodiments of this invention. It is to be understood, however, that the description is not to be taken in a limiting sense, the scope of the invention being defined in the appended claims.

Referring to the drawings:

FIGURE 1 is an exploded perspective view of the utensil of the present invention;

FIGURE 2 is a vertical section of the utensil showing it in cooking position and parts of the structure in elevation;

FIGURE 3 is a vertical section of the utensil similar to FIGURE 2 with the perforated basket in a retracted position; and FIGURE 4 is a horizontal section of the embodiment illustrated in FIGURE 2 taken along lines 4—4 showing the gear housing of the utensil.

Referring to the drawing, wherein like reference characters designate corresponding parts throughout the several figures, the lower pan 11 has an outwardly extending pan handle 12 and an outwardly and upwardly extending rim portion 13. Comprising the annular rim 13, there is a substantially horizontal outwardly extending portion 14 and an upwardly extending rim 15. Pan cover 16 has a lower rim 17 that is adapted to fit upon the annular rim 13 of the lower portion 14 and rim 15. Cover 16 also comprises a handle 18 similar in construction and appearance to pan handle 12.

Mounted upon the top of cover 16 is gear housing 19 having a bottom closing cover plate 19a which acts to close the bottom of the housing 19 to foreign substances and to provide bearing supports as described hereinafter. Housing 19 and cover plate 19a are secured to cover 16 by suitable fastening screws 20, 21. Housing 19 is mounted generally off center with respect to cover 16. To one side of the housing 19, but centered upon cover 16, are located aligned apertures 22, 23 wherein aperture 22 is located in the top wall of housing 19 and aperture 23 is located in cover plate 19a. Also in spaced vertical alignment with apertures 22, 23 is a relatively large aperture 24 of cover 16. Within apertures 22, 23 are mounted bearing surfaces 25, 26 respectively which may be well known types of sleeve bearings.

Adapted to be received within the lower pan 11 is a perforated food basket 28 having a plurality of perforations 29 through its bottom and side walls to permit the spinning off of the frying liquid. Attached to the center of the basket 28, by a hold-down member 31 and rivets 32, is a retractable shaft 33 having a circumferential peripheral groove 34 about the upper portion thereof. A portion of the shaft 33, as indicated at 35 upwardly from the groove 34, has a circular cross section, and the portion of the shaft, indicated by 36 below the groove 34, has a square cross section. As can be seen from FIGURES 2 and 3 shaft 3 is adapted to be received through aperture 24 and bearings 25, 26. The upper portion of shaft 33 has a knurled surface 37 to provide a frictional surface that permits the person using the pan to grasp and lift the shaft 33 upwardly. Below the groove 34 is bushing 38 that rotates with shaft 33 which has a square center aperture that is large enough to permit shaft 33 a freedom of longitudinal vertical sliding action therethrough but which will not allow the shaft 33 to turn therein. Bushing 38 is also in rotatable engagement with bearing 26 to provide proper alignment for shaft 33 with upper bearing 25. Resting atop of bushing 38 is gear 39 which has a square aperture 39a therein to allow it to be complementary with the square portion 36 of shaft 33. The aperture of gear 39 is sufficiently large to permit upward longitudinal movement of shaft 33 therethrough without drawing gear 39 upwardly with the shaft.

Spaced from aligned apertures 22, 23 is a second pair of aligned apertures 41, 42 through housing 19 and cover plate 19a respectfully. Within these apertures 41, 42 are mounted bearing members 43, 44 respectively through which is journaled rotating handle shaft 45 of circular cross section. Attached to the upper end of shaft 45, by fastener 46, is an elongated lever arm 47 having at its other end a crank handle 48 adapted to turn shaft 45 in a rotary manner. Fixedly and permanently coupled to shaft 45 is gear 49 which intermeshes with small gear 39. To maintain handle shaft 45 in its proper aligned position within bearings 43, 44, a collar 45a is fitted about the shaft 45 just below bearing surface 43. It is therefore seen that collar 45a prevents handle shaft 45 from being withdrawn from housing 19.

Mounted within the housing 19, and depending from the underside of the top wall, is holding pin frame 51 having an aperture 52 therethrough transverse to the longitudinal length of frame 51. Through aperture 51 is inserted a holding pin 53 that has end 54 in juxtaposition with the circular cross section portion 35 of shaft 33. Against end 55 of pin 53 rests a flat resilient spring 56 which is secured by fastener 57 at its other end to the frame 51. The function of spring 56 is to resiliently urge the holding pin against the shaft 53, and at such times as the shaft 33 is raised, the groove 34 is brought into registry with pin 53 which then engages the groove 34 and retains shaft 33 and basket 28 in a raised position.

In operation, the utensil of the present invention would be used to fry whatever food is desired, and upon completion of the frying, the person or operator using the utensil would folow the procedure as set forth hereinafter to remove the frying liquid from the fried foods. Upon completion of the frying, assuming the cover 16 to be in position upon the lower pan 11 with shaft 33 protruding through its respective apertures therein, the operator would grasp the knurled portion 37 of shaft 33, and while holding the cover 16 in place with the other hand, lift up on shaft 33. Such a procedure will draw shaft 33 upwardly and with it will come food containing basket 28 out of the frying liquid. When shaft 33 has been raised to a position where groove 34 is in registry with holding pin 53, spring 56 urges pin 53 into engagement with groove 34 thereby holding the basket 28 spaced from lower pan 11 and the frying liquid contained therein.

To remove any remaining frying liquid from the fried foods the operator then grasps crank 48 and moves it in a circular direction about shaft 45 turning gear 49 which rotates small gear 39. Gear 39 has remained in position upon bushing 38 since its aperture 39a is just enough larger than the square portion 36 of shaft 33 to prevent it being drawn upward. Upon movement, gear 39 imparts rotation to shaft 33 and basket 28 and revolves them at high velocity because of the differential in the sizes of gears 49 and 39. Upon such high velocity rotation, centrifugal force causes the remaining frying liquid on the fried foods with basket 28 to be thrown off through perforations 29 in basket 28. The thrown off liquid then drains back down into lower pan 11, and the food is left with little residual frying liquid.

When it is desired to release the shaft 33 and basket 28 from the spinning position, the operator merely gently pushes downwardly upon the top of shaft 33 which, because of the sloped surface of groove 34, overcomes the resistance of spring 56 against holding pin 53. At such time when the pin is backed out of groove 34 the shaft slides downwardly until the basket comes to rest upon the bottom of pan 11.

It is seen that the utensil of the present invention permits a person to fry foods, yet having the realization that the excess frying liquid may be removed easily, completely and cleanly from the food once the frying process is complete. Thus, from the foregoing, it is apparent that my device will accomplish its stated objectives and produce an improvement over the prior art.

While I have particularly shown and described one particular embodiment of the invention, it is distinctly understood that the invention is not limited thereto but that modifications may be made within the scope of the invention and such variations are covered by the scope of the appended claims.

I claim:
1. In a cooking utensil for removing accrued liquids from cooked foods, the combination of a lower pan, an annular rim in conjunction with the upper periphery of said lower pan, a cover member having an aperture therein and adapted to be placed upon said annular rim, a gear-housing mounted upon said cover member and having a plurality of apertures therein, a perforated basket adapted to fit within said lower pan, a retractable shaft coupled with said basket, said shaft being adapted to protrude through said cover and said housing and terminating exteriorly thereof, means to longitudinally retract said shaft through said cover and said housing, means to engageably retain said shaft in a retracted position, and means to rotate said shaft whereby said basket is rotated to remove accrued liquids from food contained therein when said shaft and said basket are in a retracted position.

2. In a cooking utensil, the combination recited in claim 1 wherein said means to engageably retain said shaft in a retracted position include a frame mounted upon the interior of said housing, an aperture through said frame, and elongated holding pin extending through said frame aperture and having one end in juxtaposition with the circular cross section of said shaft, spring means in contact with said holding pin to resiliently urge said holding pin against said shaft whereby when said shaft is retracted said circumferential groove is in registry with said holding pin so that said shaft and said basket are retained in a raised position with respect to said lower pan.

3. In a cooking utensil, the combination recited in claim 1 wherein said shaft has an upper portion of substantially circular cross section and lower portion of substantially square cross section, and a circumferential groove around the periphery of said shaft at the juncture of the circular cross section and the square cross section.

4. In a cooking utensil, the combination recited in claim 3 wherein said means to rotate said shaft comprises a rotatable handle means exterior of said housing, a handle shaft coupled to said rotatable handle means, said handle shaft being journaled in said housing, a first gear means coupled to said handle shaft, a second gear means slidably engaged about the square cross section of said retractable shaft, said first and second gear means being intermeshed whereby when said rotatable handle means is turned a rotary motion is transmitted to said retractable shaft.

References Cited by the Examiner
UNITED STATES PATENTS

| | | | |
|---|---|---|---|
| 1,413,882 | 4/22 | Wheelock | 68—23 |
| 1,432,242 | 10/22 | Gorneau | 210—360 |
| 2,348,631 | 5/44 | Keehnel | 210—361 X |

WALTER A. SCHEEL, *Primary Examiner.*